(12) United States Patent
Kim et al.

(10) Patent No.: US 10,480,590 B2
(45) Date of Patent: Nov. 19, 2019

(54) DUAL-MODE TRANSMISSION MECHANISM BASED ON TWISTED STRING ACTUATION

(71) Applicant: KOREA ADVANCED INSTITUTE OF SCIENCE AND TECHNOLOGY, Daejeon (KR)

(72) Inventors: Kyung Soo Kim, Daejeon (KR); Seok Hwan Jeong, Daejeon (KR); Jung Min Lim, Daejeon (KR); Soo Hyun Kim, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 39 days.

(21) Appl. No.: 15/806,466

(22) Filed: Nov. 8, 2017

(65) Prior Publication Data
US 2018/0266495 A1  Sep. 20, 2018

(30) Foreign Application Priority Data
Mar. 16, 2017 (KR) .................. 10-2017-0032997

(51) Int. Cl.
| F16D 23/02 | (2006.01) |
|---|---|
| F16H 19/06 | (2006.01) |
| B25J 9/10 | (2006.01) |
| F16H 25/20 | (2006.01) |

(52) U.S. Cl.
CPC .............. *F16D 23/02* (2013.01); *B25J 9/102* (2013.01); *B25J 9/104* (2013.01); *F16H 19/0654* (2013.01); *F16H 25/20* (2013.01); *F16H 2200/0034* (2013.01)

(58) Field of Classification Search
None
See application file for complete search history.

(56) References Cited

U.S. PATENT DOCUMENTS 4,843,921 A  7/1989 Kremer

FOREIGN PATENT DOCUMENTS

| KR | 10-2012-0113006 A | 10/2012 |
| KR | 10-2016-0072428 A | 6/2016 |
| KR | 10-1664622 B1 | 10/2016 |

(Continued)

OTHER PUBLICATIONS

KR1020120113006 translation (Year: 2012).*

(Continued)

*Primary Examiner* — Timothy Hannon
(74) *Attorney, Agent, or Firm* — Sughrue Mion, PLLC

(57) ABSTRACT

A dual mode twisted string actuator using a clutch is provided. The twisted string actuator according to an exemplary embodiment of the present disclosure includes: a first actuator; a first coupler which is rotated by the first actuator; a shaft which is coupled to and interlocked with the first coupler; a second coupler which is selectively interlocked with the first coupler and comprises a plurality of string receiving portions; and a string which has one end fixed to the first coupler and the other end fixed to a moving body through the string receiving portions of the second coupler. Accordingly, it is possible to reduce the size of the existing large and heavy transmission system and to miniaturize and lighten the size of the entire drive system.

13 Claims, 11 Drawing Sheets

(56) References Cited

FOREIGN PATENT DOCUMENTS

KR    10-1713758 B1    3/2017

OTHER PUBLICATIONS

Communication dated Mar. 28, 2018, issued by the Korean Patent Office in counterpart Korean Patent Application No. 10-2017-0032997.
Communication dated Jun. 13, 2018, issued by the European Patent Office in counterpart European Patent Application No. 17200917.7.

\* cited by examiner

DUAL-MODE TRANSMISSION MECHANISM BASED ON TWISTED STRING ACTUATION

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Mar. 16, 2017, and assigned Serial No. 10-2017-0032997, the entire disclosure of which is hereby incorporated by reference.

TECHNICAL FIELD OF THE INVENTION

The present disclosure relates generally to a twisted string actuator, and more particularly, to an actuator which is capable of 2-speed auto transmission shift for a motion mechanism for changing a rotary motion to a linear motion through a twisted string actuation.

BACKGROUND OF THE INVENTION

Robots are widely used in various application fields like industrial robots, surgical robots, military robots, or the like. Actuators are essential elements for implementing motions of such robots, and, from among various actuators, motors are most frequently utilized for robots.

Motors are mainly used to rotate wheels of mobile robots or to move joints of manipulators. In this case, if a robot is implemented to be driven simply by a motor with a gearbox with a fixed gear ratio and the like without a special mechanism, it would be difficult to obtain wide speed-torque operating range and performance of the robot as desired by a developer and a user since a final nominal torque and a speed of the motor are fixed. In addition, the gearbox has a large volume and weight, which leads to an increase in the volume and weight of the entire drive system.

Therefore, if such a problem is not solved due to the performance of the actuator, a special mechanism for satisfying required performance according to each application field and a use purpose of a robot would be required.

As such a special mechanism, there is a twisted string driving mechanism which can generate a large linear driving force with a small torque. Twisted string actuation mechanism is rotary-to-linear transmission that produce a remarkably high transmission ratio by twisting a single string or a pair of strings. Therefore, it can substantially amplify the linear driving force using a very light string without the need for a bulky gearbox. However, this mechanism has a disadvantage that it also suffers from a narrow speed-force operating range like a motor with a gearbox.

Most of the robots currently developed in various fields require a great driving force and a rapid driving speed. However, due to the limit on the performance of the actuator, robots are developed by designers in such a manner that the driving force and the driving speed are traded off according to a purpose of use or use of robots, and as a result, robots having satisfactory performance are not developed.

Furthermore, there is a need for a method for changing a speed at a desired time while consistently satisfying a speed-changing condition of a speed-change mechanism, and also for a method for changing a speed rapidly.

SUMMARY OF THE INVENTION

To address the above-discussed deficiencies of the prior art, it is a primary aspect of the present disclosure to provide a dual mode twisted string actuator which is capable of changing a speed using a clutch.

According to one aspect of the present disclosure, a twisted string actuator includes: a first actuator; a first coupler which is rotated by the first actuator; a shaft which is coupled to and interlocked with the first coupler; a second coupler which is selectively interlocked with the first coupler and comprises a plurality of string receiving portions; and a string which has one end fixed to the first coupler and the other end fixed to a moving body through the string receiving portions of the second coupler.

In addition, the twisted string actuator may further include a clutch configured to selectively transmit a rotational force of the first coupler to the second coupler.

In addition, the clutch may include: an idler which is rotated in association with the first coupler; and a synchronizer which is selectively coupled to and interlocked with the idler, and is coupled to and interlocked with the second coupler.

In addition, when the synchronizer is not coupled to the idler, the shaft coupled to the first coupler which is rotated by the first actuator may be rotated, but the second coupler may not be rotated, such that the string is twisted at the shaft.

When the synchronizer is coupled to the idler, the first coupler may be rotated by the first actuator and the second coupler may be rotated by the synchronizer which is rotated in association with the idler, such that the string is twisted outside the second coupler.

In addition, a dog gear formed at one side of the synchronizer and a dog gear formed at one side of the idler may be coupled to each other, such that the synchronizer and the idler are coupled to each other.

In addition, the first coupler and the second coupler may be rotated at a same speed.

In addition, when the synchronizer is not coupled to the idler, the synchronizer may be coupled to a frame in which the first actuator, the first coupler, the second coupler, and the idler are mounted.

In addition, a dog gear formed at the other side of the synchronizer and a dog gear formed at the frame may be coupled to each other, such that the synchronizer is coupled to the frame.

In addition, the clutch may further include a second actuator configured to adjust a location such that the synchronizer is selectively coupled to the first coupler.

In addition, the second actuator may be a motor which adjusts a location of the synchronizer by rotating a screw screwed into a holder to which the synchronizer is coupled.

In addition, the second actuator may be a solenoid actuator which adjusts the location of the synchronizer by linearly moving a shaft to which the synchronizer is coupled.

According to another aspect of the present disclosure, an apparatus may include: a moving body; a first actuator; a first coupler which is rotated by the first actuator; a shaft which is coupled to and interlocked with the first coupler; a second coupler which is selectively interlocked with the first coupler and comprises a plurality of string receiving portions; and a string which has one end fixed to the first coupler and the other end fixed to the moving body through the string receiving portions of the second coupler.

According to embodiments of the present disclosure as described above, the total size of a system can be made to be slim and light by using a small twisted string actuation mechanism which can linearly reciprocate without using a large and heavy gearbox. In particular, it is advantageous to a robot hand and a small manipulator which are required to be light and slim as a driving mechanism, and areas of application can greatly increase.

Furthermore, since the speed change function of the present disclosure can dramatically increase the final speed-force operating range of the actuator, it can prevent the developer and the user from selecting an excessive specification motor in order to obtain the desired robot performance.

In addition, according to embodiments of the present disclosure, speed change is made by determining the location of the synchronizer, and thus, the operation after speed changing depends on only the main motor regardless of the clutch motor, which moves the synchronizer. Therefore, a problem of performance degradation or limitation caused by the clutch motor may not arise.

In addition, according to embodiments of the present disclosure, since a rotation-linearity gear ratio of a lead screw which generates a linear motion of the synchronizer is very high, a friction of a dog gear can be sufficiently overcome and the linear motion can be generated even if the performance of the clutch motor is very low. Therefore, the volume of the clutch motor which is additionally needed to constitute a transmission system and additional energy consumption can be minimized.

In addition, according to embodiments of the present disclosure, since a transmission ratio can be instantaneously changed at a mode transition point, an immediate transmission response to a change in a transmission speed and an external environment is possible.

In addition, according to embodiments of the present disclosure, since an infinite transmission ratio appears at the mode transition point, an effect like a brake can be obtained without an additional brake device, such that two features of changing the transmission ratio and achieving the brake effect can be obtained simultaneously.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Hereinafter, the present disclosure will be described in detail with reference to the accompanying drawings.

Figure 1:
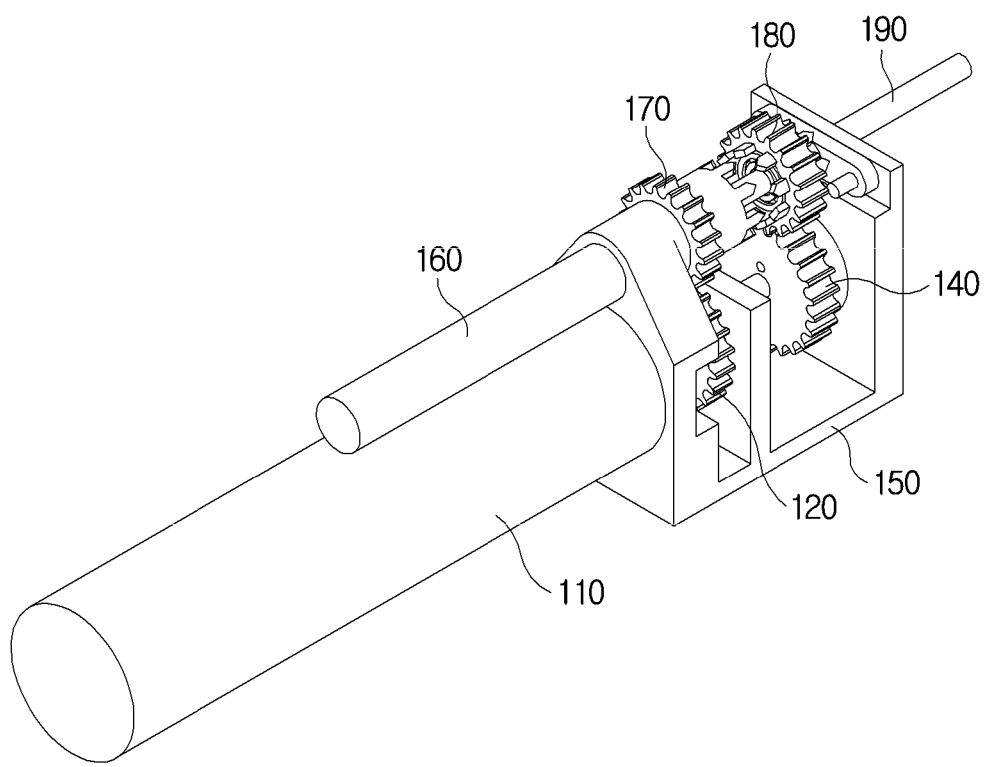
FIG. 1 is a perspective view showing a dual mode twisted string actuator according to an exemplary embodiment of the present disclosure.
Figure 2:
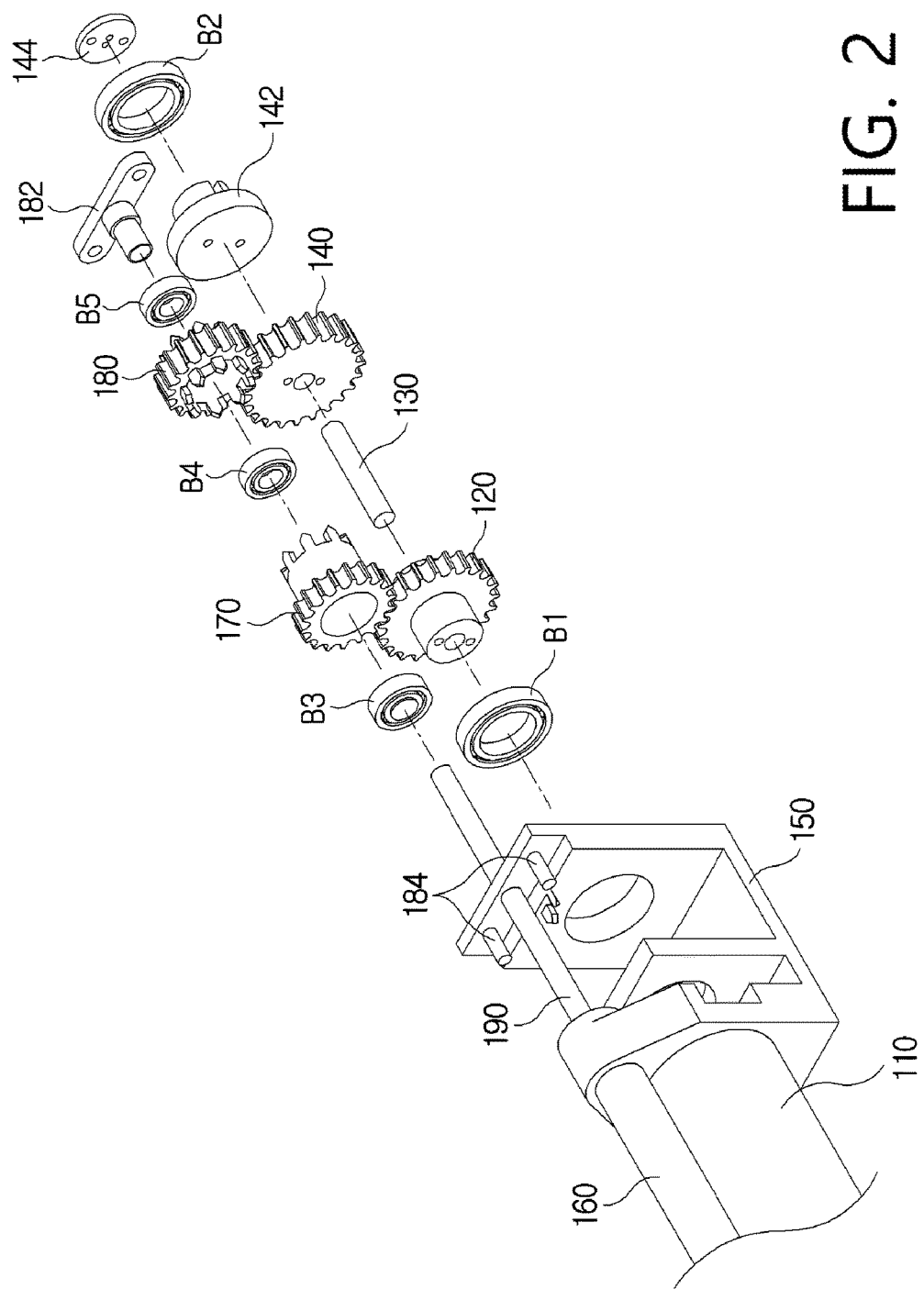
FIG. 2 is an exploded perspective view of the dual mode twisted string actuator shown in FIG. 1.

FIG. 1 is a perspective view of a dual mode twisted string actuator according to an exemplary embodiment of the present disclosure, and FIG. 2 is an exploded perspective view of the dual mode twisted string actuator shown in FIG. 1.

The dual mode twisted string actuator according to an exemplary embodiment of the present disclosure, which is a transmission performing a linear motion, is a small actuator which converts between a speed mode (high-speed mode) and a force mode (low-speed mode), that is, performs two-phase speed conversion, by changing a radius of a twisted string.

As shown in the drawings, the dual mode twisted string actuator according to an exemplary embodiment of the present disclosure includes a main motor 110, a twisted coupler (TC)1 120, a shaft 130, a TC2 140, a TC2 holder 142, a TC2 cap 144, a frame 150, a clutch motor 160, a TC1 idler 170, a synchronizer 180, a synchronizer holder 182, a synchronizer holder guide 184, a lead-screw 190, and bearings B1, B2, B3, B4, B5.

The main motor 110 is a rotation actuator which generates a rotational force and transmits the rotational force to the TC1 120.

The TC1 120 is mounted in the frame 150 through the bearing 1 B1 and is connected to the main motor 110 via a rotary shaft. Accordingly, the TC1 120 is rotated by the main motor 110 and performs a rotary motion in relation to the frame 150.

The shaft 130 is fixedly coupled to the TC1 120 and is rotated with the TC1 120 in association with the rotary motion of the TC1 120.

The TC2 140 is coupled to the TC2 holder 142 and the TC2 holder 142 is mounted in the frame 150 through the bearing 2 B2, such that the TC2 140 performs a rotary motion in relation to the frame 150.

The TC2 cap 144 is fixed to the TC2 holder 142 to which the bearing 2 B2 is coupled by means of a screw so as to prevent the TC2 holder 142 to which the TC2 140 is coupled from being decoupled from the bearing 2 B2.

The TC2 140 has a shaft receiving portion formed at the center thereof as a space to receive an end of the shaft 130.

Since the shaft receiving portion is not fixedly coupled to the shaft 130, the TC2 140 is not rotated in association with the shaft.

Figure 3:
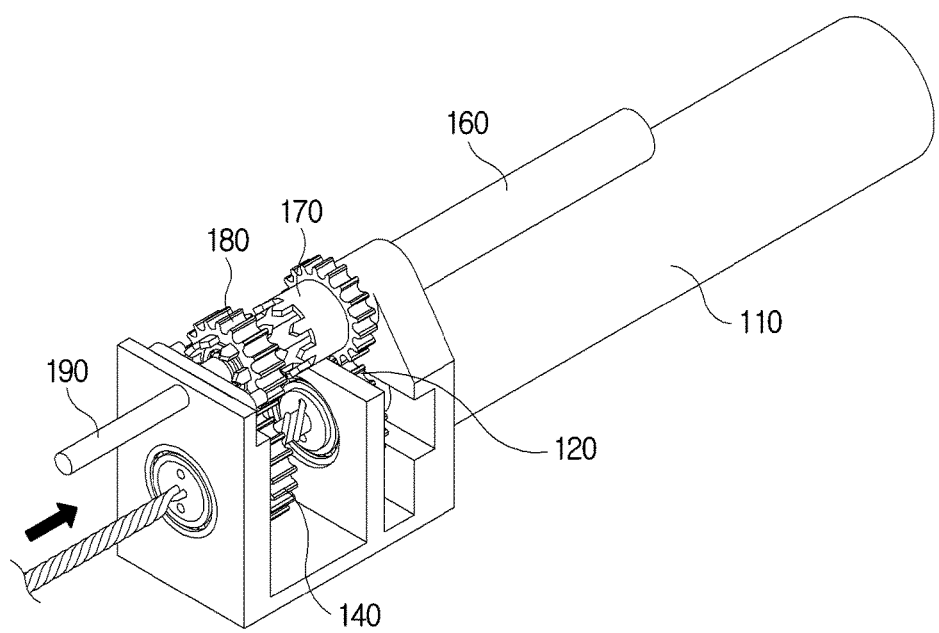
FIG. 3 is a perspective view of a dual mode twisted string actuator in which a pair of strings are mounted.

In addition, the TC2 140 has a pair of string receiving portions formed on the outside of the shaft receiving portion. As shown in FIG. 3, a pair of strings has one end fixed to the TC1 120 and the other end fixed to a moving body (not shown) through the shaft receiving portion formed in the TC2 140.

The main motor 110 and the clutch motor 160 are fixedly coupled to the frame 150, and the TC1 120, the TC2 holder 142 to which the TC2 140 is coupled, and the TC1 idler 170 and the lead screw 190 which will be described later are rotatably coupled to the frame 150, and also, the synchronizer holder guide 184 is formed on the frame 150.

The other elements of the dual mode twisted string actuator according to an exemplary embodiment of the present disclosure, the clutch motor 160, the TC1 idler 170, the synchronizer 180, the synchronizer holder 182, the synchronizer holder guide 184, and the lead-screw 190, which will be described below, constitute a dog clutch which enables speed conversion by changing the radius of the twisted string.

The dog clutch, which is a kind of transmission, performs two-phase speed change by selectively transmitting the rotational force generated at the main motor 110 to the TC2 140.

The clutch motor 160 generates a rotational force and rotates the lead-screw 190 fixedly coupled thereto.

Figure 4:
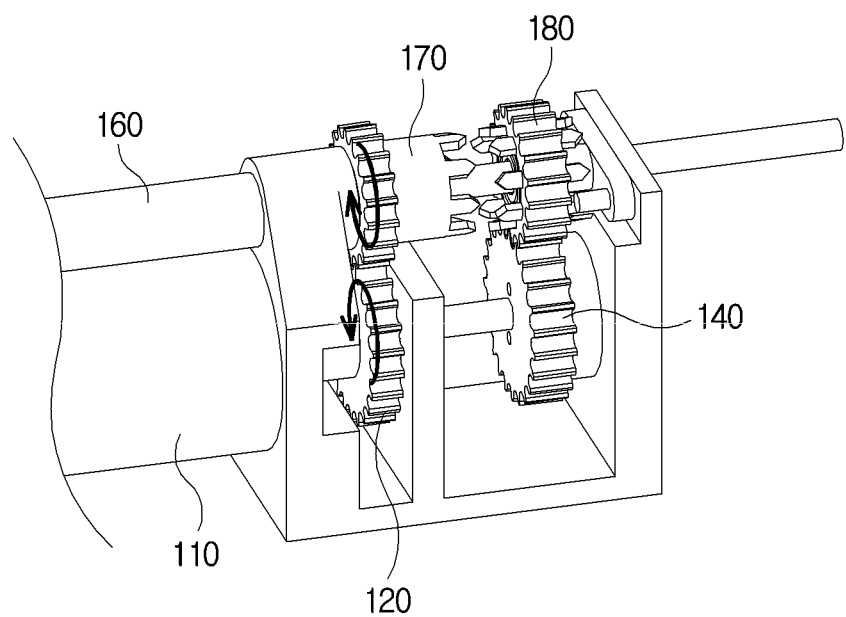
FIG. 4 is a view showing an interlocking rotation of a TC1 and a TC1 idler.

The TC1 idler 170 is mounted in the frame 150 through the bearing 3 B3 and shares a rotary axis with the lead-screw 190 and is gear-engaged with the TC1 120. Accordingly, the TC1 idler 170 is not rotated in association with the lead-screw 190 and is rotated in association with the TC1 120 as shown in FIG. 4.

The synchronizer 180 is coupled to the synchronizer holder 182 through the bearings 3 and 4 B3 and B4. Accordingly, the synchronizer 180 may be rotated about the synchronizer holder 182.

In addition, the synchronizer holder 182 is coupled to the synchronizer holder guide 184 so as to be able to perform only a linear motion along the synchronizer holder guide 184, and has the lead-screw 190 screwed thereinto.

Accordingly, the rotary motion of the lead-screw 190 made by the clutch motor 160 causes the linear motion of the synchronizer 180 fixed to the synchronizer holder 182 having the lead-screw 190 screwed thereinto.

Figure 5:
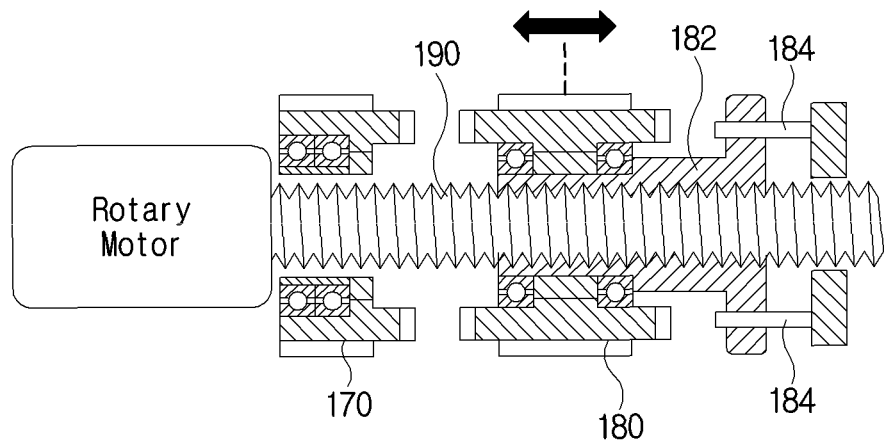
FIGS. 5 to 8 are views provided to illustrate a clutch in detail.
Figure 6:
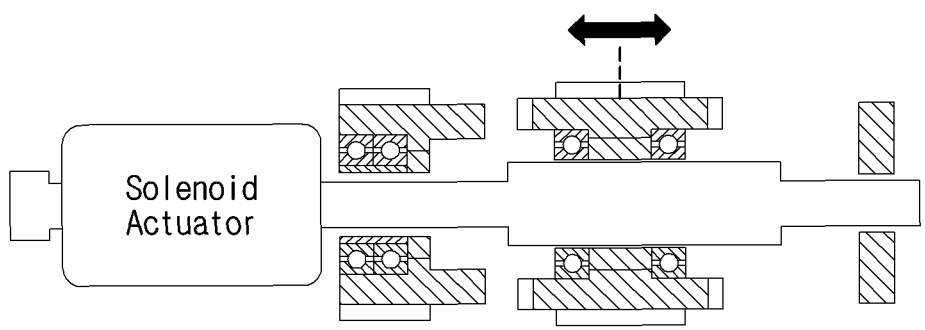

The clutch motor 160 may be implemented by using a rotary motor as shown in FIG. 5, or may be substituted with a solenoid actuator which adjusts a location of the synchronizer 180 by linearly moving a shaft to which the synchronizer 180 is coupled as shown in FIG. 6. This is a matter of implementing and selecting.

Figure 7:
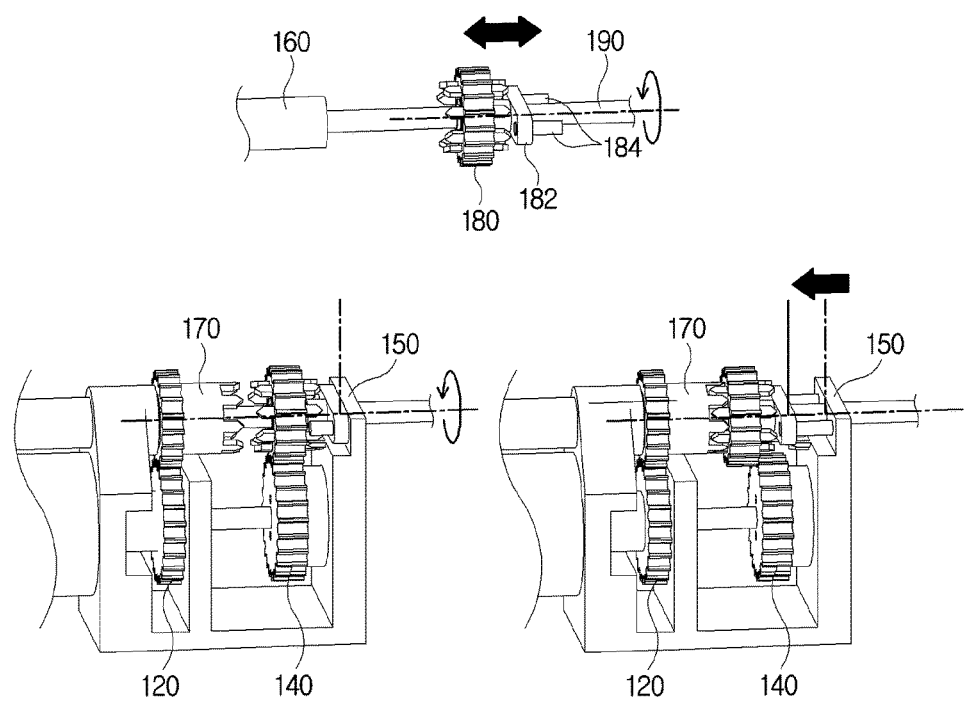

The synchronizer 180 may be decoupled from the TC1 idler 170 as shown in the lower left view of FIG. 7 or may be coupled to the TC1 idler 170 as shown in the lower right view of FIG. 7 according to the linear motion, thereby forming different power transmitting paths.

The former case indicates a state in which the twisted string actuator operates in the speed mode and the latter case indicates a state in which the twisted string actuator operates in the force mode.

Figure 8:
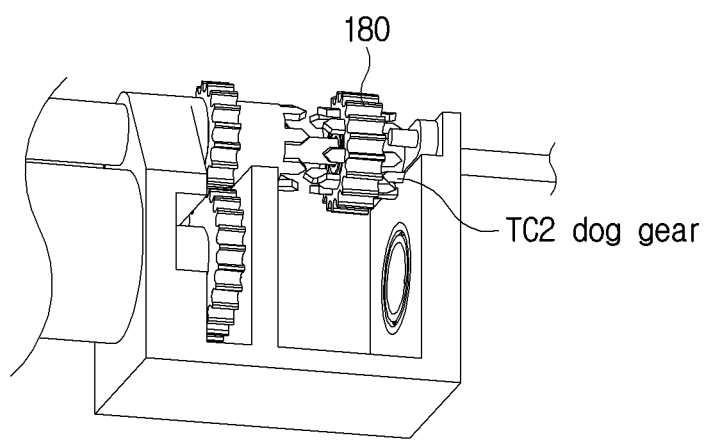

In the speed mode, a dog gear formed on the right side of the synchronizer 180 is coupled to a dog gear formed on the frame 150 as shown in FIG. 8, and, in the force mode, a dog gear formed on the right side of the TC1 idler 170 and a dog gear formed on the left side of the synchronizer 180 are coupled to each other as shown in the lower right view of FIG. 7.

An operation in each of the speed mode and the force mode will be described in detail with reference to FIG. 9.

Figure 9:
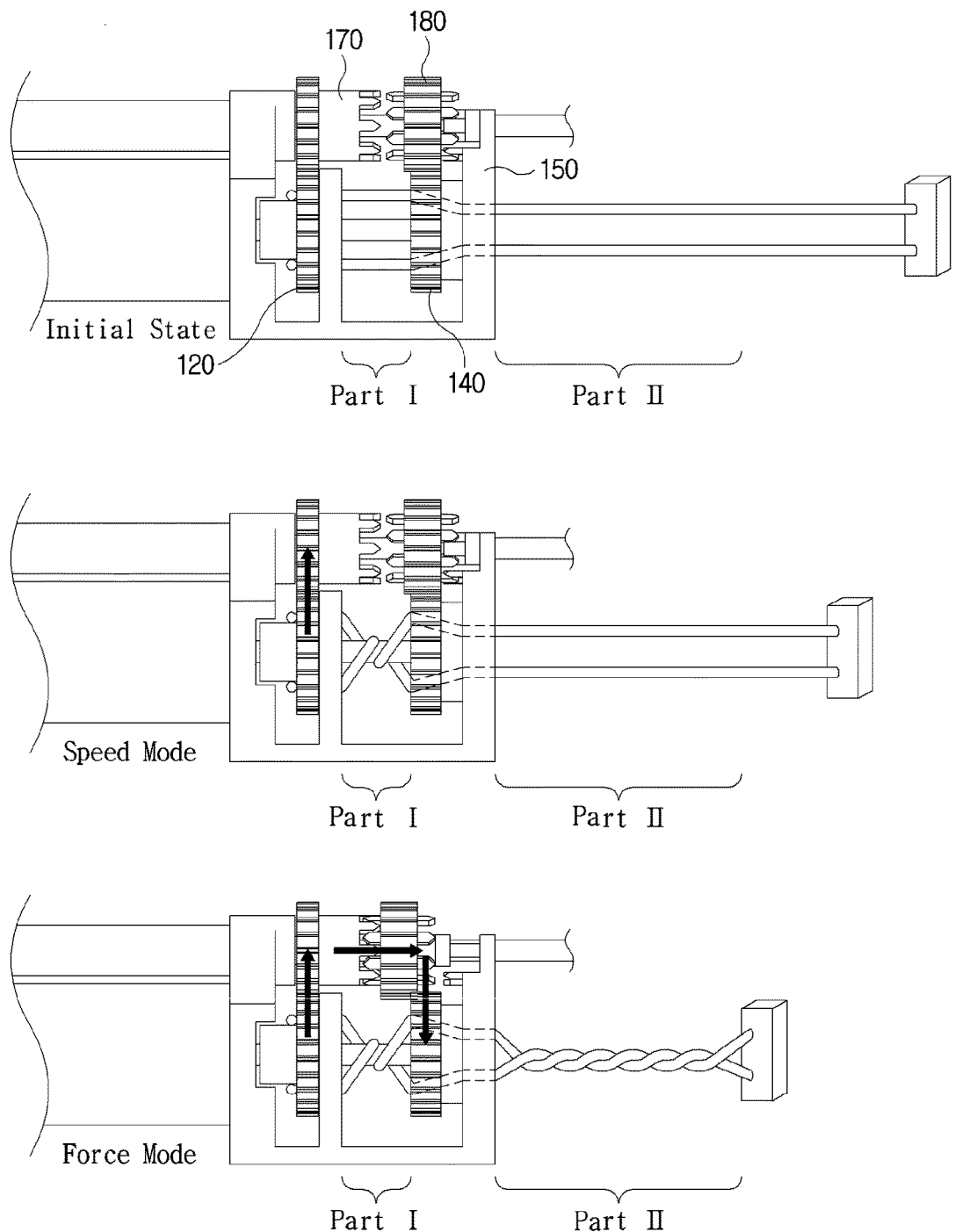
FIG. 9 is a view provided to illustrate an operation mode.

The upper view of FIG. 9 illustrates the twisted string actuator in an initial mode. As shown in the drawing, in the initial mode, the synchronizer 180 is decoupled from the TC1 idler 170 and is fixedly coupled to the frame 150, and the strings are not twisted.

The middle view of FIG. 9 illustrates the twisted string actuator in the speed mode. As shown in the drawing, in the speed mode, the synchronizer 180 is decoupled from the TC1 idler 170 and is fixedly coupled to the frame 150.

In addition, the TC1 idler 170 is rotated in association with the TC1 120 which is rotated by the main motor 110, but the synchronizer 180 fixedly coupled to the frame 150 is not rotated and is fixed and the TC2 140 interlocked with the synchronizer 180 is not rotated and is fixed.

Accordingly, the rotation of the TC1 120 made by the main motor 110 causes only the rotation of the shaft 130 fixedly coupled to the TC1 120, thereby twisting the strings at a Part I portion (shaft 130). Therefore, the length of the strings may be adjusted at high speed even with a small contraction force.

The lower view of FIG. 9 illustrates the twisted string actuator in the force mode. As shown in the drawing, in the force mode, the synchronizer 180 is decoupled from the frame 150 and is fixedly coupled to the TC1 idler 170.

Accordingly, the synchronizer 180 coupled to the TC1 idler 170 which is rotated in association with the TC1 120 rotated by the main motor 110 is rotated and the TC2 140 coupled to the synchronizer 180 is also rotated by the rotation of the synchronizer 180.

Accordingly, the TC1 120 and the TC2 140 are rotated with each other by the main motor 110 at the same speed, thereby twisting the strings only at a Part II portion without twisting at the Part I portion (shaft 130). Therefore, the length of the strings may be adjusted at slow speed with a great contraction force.

As described above, the twisted string actuator according to an exemplary embodiment of the present disclosure linearly moves the synchronizer 180 using the clutch motor 160 and selectively transmits the rotational force of the main motor 110/TC1 120 to the TC2 140, such 2-speed transmission shift on string length adjustment can be implemented by adjusting the radius of the twisted string.

Figure 10:
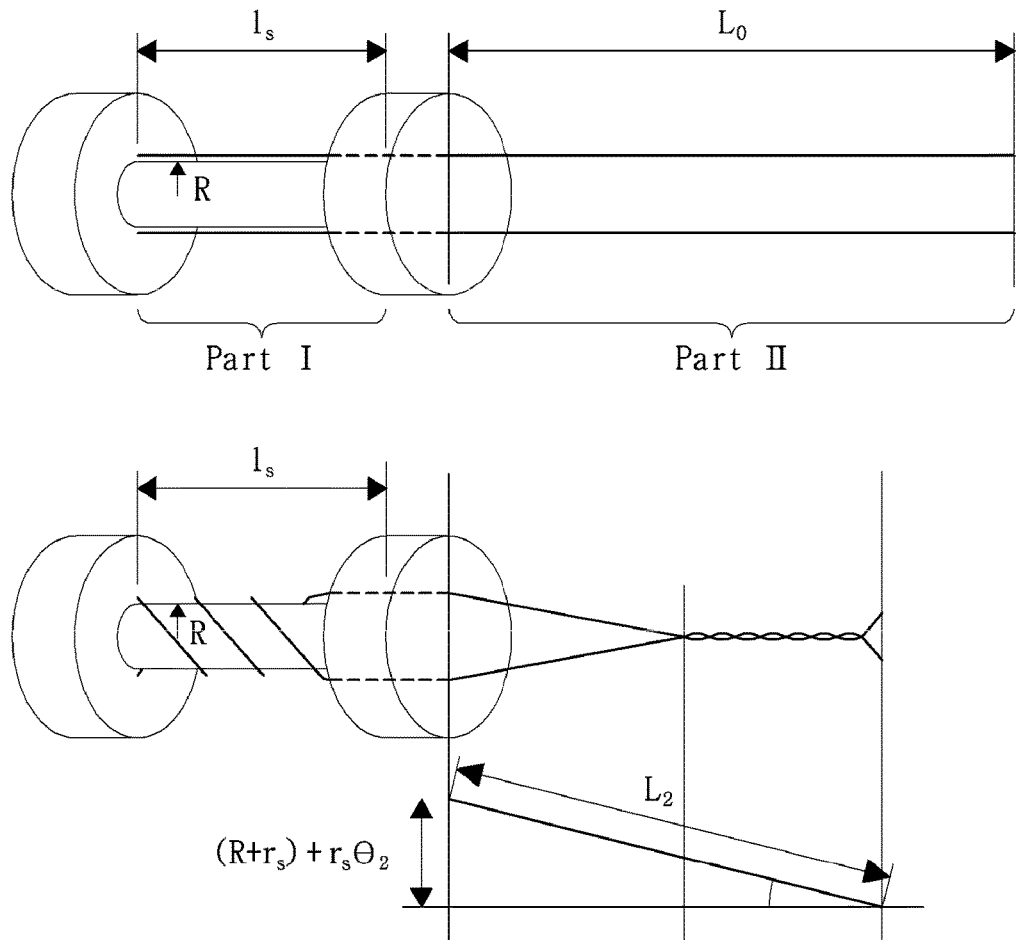
FIG. 10 is a view provided to additionally explain system modeling.

The contraction length of the string according to the string twisted by the twisted string actuator according to an embodiment of the present disclosure may be estimated based on the following equations:

$$\Delta\angle_1 = \sqrt{l_s^2 + (R+r_s)^2(\theta_1-\theta_2)^2} - l_s \qquad \text{Equation 1}$$

$$\Delta\angle_2 = \sqrt{L_2^2 - (R+r_s)^2} - \sqrt{L_2^2 - (R+r_s+r\theta_2)^2} \qquad \text{Equation 2}$$

$$\Delta\angle = \Delta\angle_1 + \Delta\angle_2 \qquad \text{Equation 3}$$

where $\Delta\angle_1$ is a length of the string which is contracted by twisting at the Part I portion, $\Delta\angle_2$ is a length of the string which is contracted by twisting at the Part II portion, $l_s$ is a length of the shaft 130, R is a radius of the shaft 130, $r_s$ is a radius of the string (S), $\theta_1$ is a radian of the TC1 120, $\theta_2$ is a radian of the TC2 140, $L_0$ is a length of the Part II in the initial state in which twisting does not occur at the Part I portion and the Part II portion, $L_2$ is a length of the Part II in a state in which twisting does not occur at the Part II portion, and $\Delta\angle$ is a length of the string which is finally contracted by twisting at the Part I portion and the Part II portion (see FIG. 10).

According to equations (1) and (2), $L_2$ equals $\angle_0-\Delta\angle 1$. Accordingly, through equation (3), the contraction length $\Delta\angle$ of the string according to the rotation of the TC1 120 and the TC2 140 may be estimated. The number of rotations of the TC1 120 may be the same as the number of rotations of the main motor 110, and the TC2 140 is stopped in the speed mode and has the same rotation speed as that of the TC1 in the force mode. Therefore, the number of rotations of the TC1 120 and the TC2 120 may be known.

Based on the mathematical modeling described above, the contraction length of the string and a transmission ratio may be controlled.

Figure 11:
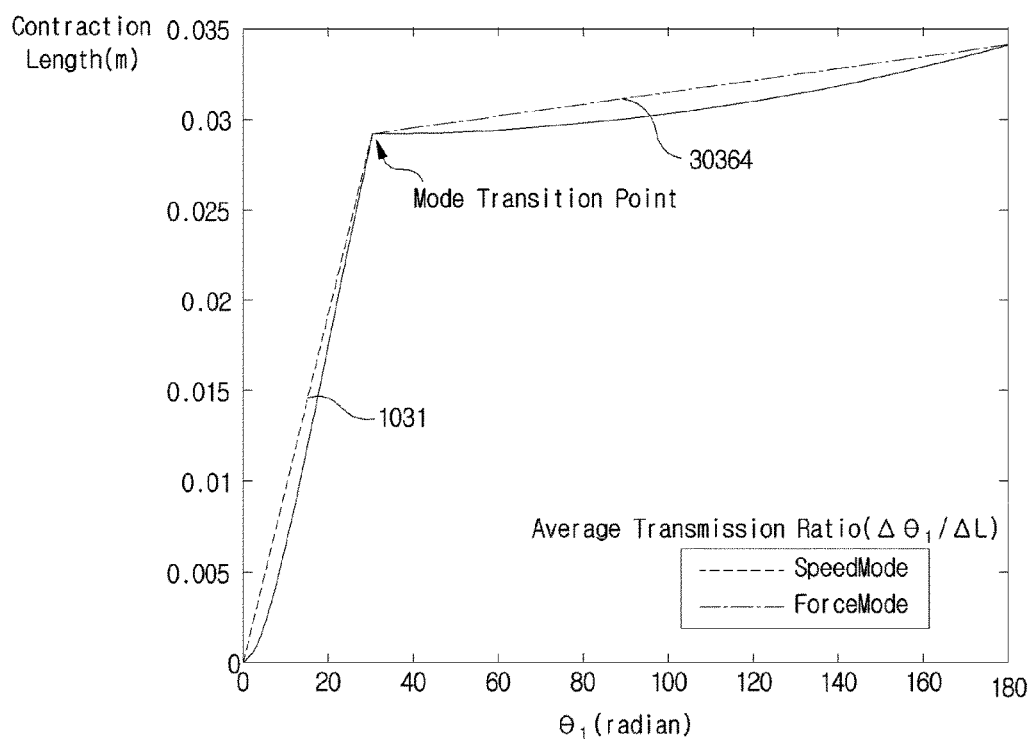
FIG. 11 is a graph showing a contraction length according to a rotation of a main motor.

A result of calculating the contraction length of the string according to the rotation of the main motor 110/TC1 120 according to the above-described equations is illustrated in FIG. 11. As can be seen from the graph illustrated in FIG. 11, the transmission ratio is instantaneously changed by changing the location of the synchronizer 180 at a mode transition point.

Figure 12:
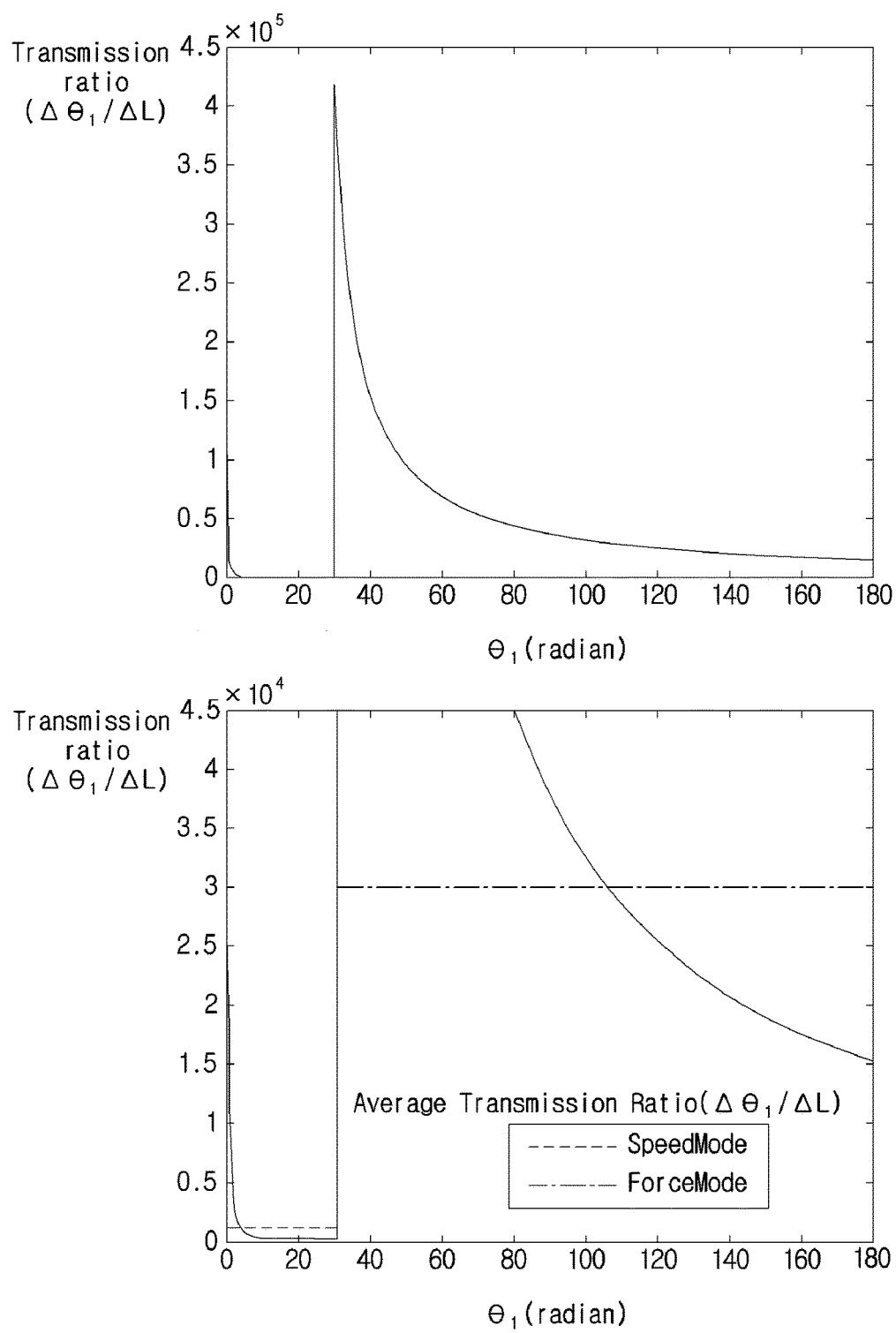
FIG. 12 is a graph showing a rotation-linearity transmission ratio.

The graph of FIG. 12 illustrates a rotation-linearity transmission ratio which is the derivative of the graph of FIG. 11 with respect to the radian ($\theta_1$) of the TC1 120. As shown in FIG. 12, an infinite transmission ratio appears at the mode transition point, which makes it possible to obtain an effect like a brake without an additional brake device.

Accordingly, the string may be fixed at a certain time through mode conversion. This characteristic appears since a change rate of a contraction length according to a twisted string in a twisted string mechanism is not linear, and two features of changing a transmission ratio and achieving a brake effect can be obtained simultaneously using the above-described characteristic.

Up to now, preferred embodiments of the dual mode twisted string actuator using the clutch have been described.

The dual mode twisted string actuator according to an embodiment of the present disclosure may be used as a driving mechanism of a robot hand finger or a small manipulator which is required to be light and slim, and may also be used for other instruments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A twisted string actuator comprising:
    a first actuator;
    a first coupler which is rotated by the first actuator;
    a shaft which is coupled to and interlocked with the first coupler;
    a second coupler which is selectively interlocked with the first coupler and comprises a plurality of string receiving portions; and
    a string which has one end fixed to the first coupler and the other end fixed to a moving body through the string receiving portions of the second coupler.

2. The twisted string actuator of claim 1, further comprising a clutch configured to selectively transmit a rotational force of the first coupler to the second coupler.

3. The twisted string actuator of claim 2, wherein the clutch comprises:
    an idler which is rotated in association with the first coupler; and
    a synchronizer which is selectively coupled to and interlocked with the idler, and is coupled to and interlocked with the second coupler.

4. The twisted string actuator of claim 3, wherein, when the synchronizer is not coupled to the idler, the shaft coupled to the first coupler which is rotated by the first actuator is rotated, but the second coupler is not rotated, such that the string is twisted at the shaft.

5. The twisted string actuator of claim 3, wherein, when the synchronizer is coupled to the idler, the first coupler is rotated by the first actuator and the second coupler is rotated by the synchronizer which is rotated in association with the idler, such that the string is twisted outside the second coupler.

6. The twisted string actuator of claim 5, wherein a dog gear formed at one side of the synchronizer and a dog gear formed at one side of the idler are coupled to each other, such that the synchronizer and the idler are coupled to each other.

7. The twisted string actuator of claim 5, wherein the first coupler and the second coupler are rotated at a same speed.

8. The twisted string actuator of claim 5, wherein, when the synchronizer is not coupled to the idler, the synchronizer is coupled to a frame in which the first actuator, the first coupler, the second coupler, and the idler are mounted.

9. The twisted string actuator of claim 8, wherein a dog gear formed at the other side of the synchronizer and a dog gear formed at the frame are coupled to each other, such that the synchronizer is coupled to the frame.

10. The twisted string actuator of claim 3, wherein the clutch further comprises a second actuator configured to adjust a location such that the synchronizer is selectively coupled to the first coupler.

11. The twisted string actuator of claim 10, wherein the second actuator is a motor which adjusts a location of the synchronizer by rotating a screw screwed into a holder to which the synchronizer is coupled.

12. The twisted string actuator of claim 10, wherein the second actuator is a solenoid actuator which adjusts the location of the synchronizer by linearly moving a shaft to which the synchronizer is coupled.

13. An apparatus comprising:
    a moving body;
    a first actuator;
    a first coupler which is rotated by the first actuator;
    a shaft which is coupled to and interlocked with the first coupler;
    a second coupler which is selectively interlocked with the first coupler and comprises a plurality of string receiving portions; and
    a string which has one end fixed to the first coupler and the other end fixed to the moving body through the string receiving portions of the second coupler.

* * * * *